United States Patent
Matusovsky et al.

(10) Patent No.: US 9,838,946 B2
(45) Date of Patent: Dec. 5, 2017

(54) HEURISTIC SPANNING METHOD AND SYSTEM FOR LINK STATE ROUTING

(71) Applicant: MAXTECH COMMUNICATION NETWORKS LTD., Yavne (IL)

(72) Inventors: Yakir Matusovsky, Rishon Le Zion (IL); Uzi Hanuni, Gavat Yeshayahu (IL); Boaz Dagan, Gedera (IL)

(73) Assignee: MAXTECH COMMUNICATION NETWORKS LTD., Yavne (IL)

( * ) Notice: Subject to any disclaimer, the term of this patent is extended or adjusted under 35 U.S.C. 154(b) by 0 days.

(21) Appl. No.: 14/384,781

(22) PCT Filed: Mar. 12, 2013

(86) PCT No.: PCT/IL2013/050229
§ 371 (c)(1),
(2) Date: Sep. 12, 2014

(87) PCT Pub. No.: WO2013/136332
PCT Pub. Date: Sep. 19, 2013

(65) Prior Publication Data
US 2015/0023246 A1    Jan. 22, 2015

Related U.S. Application Data

(60) Provisional application No. 61/610,553, filed on Mar. 14, 2012.

(51) Int. Cl.
| | | |
|---|---|---|
| H04W 88/04 | (2009.01) |
| G06F 15/18 | (2006.01) |
| H04L 12/26 | (2006.01) |
| H04L 12/28 | (2006.01) |
| H04W 40/22 | (2009.01) |
| H04W 40/30 | (2009.01) |
| H04L 12/753 | (2013.01) |
| H04L 12/707 | (2013.01) |

(52) U.S. Cl.
CPC ............. *H04W 40/22* (2013.01); *H04L 45/24* (2013.01); *H04L 45/48* (2013.01); *H04W 40/30* (2013.01)

(58) Field of Classification Search
CPC ....... H04L 12/707; H04L 45/24; H04L 45/48; H04L 12/26; H04W 40/22; H04W 40/30; H04B 17/373; H04B 17/345; H04B 17/40
USPC ......................................................... 370/315
See application file for complete search history.

(56) References Cited

U.S. PATENT DOCUMENTS

| | | | |
|---|---|---|---|
| 7,720,020 B2* | 5/2010 | Larsson .................. | 370/315 |
| 2004/0172474 A1* | 9/2004 | Markaryan et al. ........ | 709/228 |

(Continued)

OTHER PUBLICATIONS

United States Patent and Trademark Office, "International Search Report and Written Opinion International Application No. PCT/IL2013/050229", dated Jul. 10, 2013, USA.

*Primary Examiner* — Edan Orgad
*Assistant Examiner* — Vanneilian Lalchinthang (57) ABSTRACT

A system and method for selecting at least one relay in a communication network; the network comprises a plurality of nodes; each of the nodes comprises at least one processing unit; each pair of the nodes is characterized by a first connection number; a first score is associated with each pair of (i) first first connection number; and (ii) second first connection number; each of the processing unit is programmed to execute the method.

16 Claims, 4 Drawing Sheets

(56) References Cited

U.S. PATENT DOCUMENTS

| | | | |
|---|---|---|---|
| 2008/0268855 A1* | 10/2008 | Hanuni | H04W 72/0406 455/445 |
| 2010/0238816 A1* | 9/2010 | Suh | H04L 25/24 370/252 |
| 2011/0267982 A1* | 11/2011 | Zhang | H04B 7/2606 370/256 |
| 2012/0002537 A1* | 1/2012 | Bao et al. | 370/221 |
| 2013/0083722 A1* | 4/2013 | Bhargava | H04W 72/085 370/315 |

\* cited by examiner

$$TFN = \begin{bmatrix} 0 & n_1 & n_2 & n_3 \\ 0 & 0 & n_4 & n_5 \\ 0 & 0 & 0 & n_6 \\ 0 & 0 & 0 & 0 \end{bmatrix}$$

400

Fig. 4a $$TFN = \begin{bmatrix} 0 & 8 & 15 & 22 \\ 0 & 0 & 6 & 11 \\ 0 & 0 & 0 & 4 \\ 0 & 0 & 0 & 0 \end{bmatrix}$$

HEURISTIC SPANNING METHOD AND SYSTEM FOR LINK STATE ROUTING

FIELD OF THE INVENTION

The present invention generally pertains to the field of creating a link-state routing protocol for finding an optimal spanning tree in a communication network.

BACKGROUND

Optimizing management of communication networks has been a continuous challenge for many years. The communication network management system requires finding the balance between using of system resources and optimizing the connectivity of network users.

The following prior art is believed to be the current status of the art.

Throughout the years various protocols have been used to optimize the network management system, among them are: Ad Hoc On-Demand Distance Vector (AODV) On-Demand Multicast Routing Protocol (ODMRP) Optimized Link State Routing Protocol (OSLR) Differential Destination Multicast (DDM) routing protocol Multicast Ad hoc On-Demand Distance Vector (MAODV) routing protocol Topology Broadcast based on Reverse-Path Forwarding (TBRPF) Dynamic Source Routing (DSR) Temporally-Ordered Routing Algorithm (TORA) Zone Routing Protocol for Ad Hoc Networks (ZRP) Source-Tree Adaptive Routing (STAR).

All of these methods are based on the spanning tree describing the network or parts of it at a given time. While only a small portion of the methods apply any consideration to the quality of communication between network nodes, none of them do so in view of the entire network status. This state of affairs can lead to considerable data loss during operation of the network. Consequently, due to lake of information (either by status of the network or by strength of connections) in the stage of spanning a tree, a truly optimal tree cannot be spanned.

There is therefore a long unmet need for a method of managing networks which will consider not only the binary state of connected\disconnected of two specific nodes, but also the quality of this connection.

SUMMARY

An object of the invention is to provide a method for selecting at least one relay in a communication network; the network comprises a plurality of nodes; each of the nodes comprises at least one processing unit; each pair of the nodes is characterized by a first connection number; a first score is associated with each pair of (i) first first connection number; and (ii) second first connection number; each of the processing unit is programmed to execute the method; wherein the method comprising:
a. setting at least one first node to be a relay;
b. for one of the relays, selecting a second connection number for each third node; the third node is connected to the relay via a second node; the second connection number is selected from a group consisting of (i) first connection number of the pair of third node and the second node, (ii) first connection number of the pair of second node and the relay; and (iii) a combination thereof;
c. associating each of the third nodes with the first score; the first score is of pair consisting of (i) the first connection number characterizing the third node and the first node; and (ii) the second connection number characterizing the third node;
d. characterizing each of the second node with second score; the second score is selected from a group consisting of (i) first scores of the third nodes; (ii) sum of the first scores of the third nodes; and (iii) a combination thereof;
e. selecting at least one of the second nodes in accordance with the second score of the second nodes;
f. repeating steps (b) to (e) for all relays in the network;
g. setting at least one of the selected second nodes to be a relay in the network;
h. updating the network with the selected relays; and
i. if stopping criterion is not satisfied, repeating steps (b) to (h) for all relays in the network; the stopping criterion is selected from a group comprising of (i) numbers of relays in the network is larger than M, M is a predefined integer greater than 0; (ii) each of the nodes in the communication network is connected to at least one relay.

It is another object of the invention to disclose the method as defined above, additionally comprising step of performing the method on a time changing network; the method is performed at predetermined time steps.

It is another object of the invention to disclose the method as defined above, where method is performed on a time changing network at predetermined time steps, wherein each of the first connection number, second connection number and first score is defined for each time the method is performed.

It is another object of the invention to disclose the method as defined above, additionally comprising step of performing the method on a time changing network upon demand.

It is another object of the invention to disclose the method as defined above, where method is performed on a time changing network upon demand, wherein each of first connection number, second connection number and first score is defined for each time the method is performed.

It is another object of the invention to disclose the method as defined above, wherein characterizing second node with second score depends upon number of relays connected to the second node.

It is another object of the invention to disclose the method as defined above, wherein the first connection number characterizes quality of connection.

It is another object of the invention to disclose the method as defined above, additionally comprising step of providing step of changing the predetermined integer M.

It is another object of the invention to disclose a system for selecting at least one relay in a communication network; the network comprises a plurality of nodes; each of the nodes comprises at least one processing unit; each pair of the nodes is characterized by a first connection number; a first score is associated with each pair of (i) first first connection number; and (ii) second first connection number; for each node the processing unit is programmed to set itself to be a relay; wherein each of the processing unit is programmed to execute the following steps:
a. select a second connection number for each third node; the third node is connected to the relay via a second node; the second connection number is selected from a group consisting of (i) first connection number of the pair of third node and the second node, (ii) first connection number of the pair of second node and the relay; and (iii) a combination thereof;
b. associate each of the third nodes with the first score; the first score is of pair consisting of (i) the first connection number characterizing the third node and the first node; and (ii) the second connection number characterizing the third node;

c. characterize each of the second node with second score; the second score is selected from a group consisting of (i) first scores of the third nodes; (ii) sum of the first scores of the third nodes; and (iii) a combination thereof;

d. select at least one of the second nodes in accordance with the second score of the second nodes;

e. repeat steps (a) to (d) for all relays in the network;

f. set at least one of the selected second nodes to be a relay in the network;

g. update the network with the selected relays; and h. if stopping criterion is not satisfied, repeating steps (a) to (g) for all relays in the network; the stopping criterion is selected from a group comprising of (i) numbers of relays in the network is larger than M, M is a predefined integer greater than 0; (ii) each of the nodes in the communication network is connected to at least one relay.

It is another object of the invention to disclose the system as defined above, wherein the processing unit is programmed to execute actions (a)-(h) on a time changing network; the actions are performed at predetermined time steps.

It is another object of the invention to disclose the system as defined above, wherein each of the first connection number, second connection number and first score is defined for each time the actions (a)-(h) are performed on a time-changing network at predetermined time-steps.

It is another object of the invention to disclose the system as defined above, wherein the processing unit is programmed to execute actions (a)-(h) on a time changing network upon demand.

It is another object of the invention to disclose the system as defined above, wherein each of first connection number, second connection number and first score is defined for each time the method is performed on a time-changing network upon demand.

It is another object of the invention to disclose the system as defined above, wherein characterizing second node with second score depends upon number of relays connected to the second node.

It is another object of the invention to disclose the system as defined above, wherein the first connection number characterizes quality of connection.

It is another object of the invention to disclose the system as defined above, wherein the predetermined integer M is changeable.

BRIEF DESCRIPTION OF THE DRAWINGS

In order to understand the invention and to see how it may be implemented in practice, a few preferred embodiments will now be described, by way of non-limiting example only, with reference to be accompanying drawings, in which.

DETAILED DESCRIPTION OF THE INVENTION

The following description is provided so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide methods and systems for relay selection in a communication network. Also, it is to be understood that the phraseology and terminology employed herein is for the purpose of description and should not be regarded as limiting.

The term 'Node' refers hereinafter to a single physical entity (moving or static) with an independent processing unit and at least one communication interface for networking. Considered as a single member of a network, a node could be considered a network of a single physical unit.

The term 'Relay' refers hereinafter to a node, which can in a specific time of operation, be used as an interpreter of information between two or more other network nodes.

The term 'Backbone' refers hereinafter to a bidirectional loop less graph composed of Relays (as its vertices).

The term 'Routing' refers hereinafter to the process of selecting paths in a network along which to send network traffic The term 'Link-state routing' refers hereinafter to decisions on paths achieved by a node sharing the same information about the links with the rest of the nodes in the network, assuming all knowledge about links to the neighbors was somehow transferred to every node. The basic concept of link-state routing is that every node constructs a map of the connectivity to the network, converting this map to a connected graph, and using it to know the routing from point to point or from point to multipoint.

The present invention provides a method for selecting at least one relay in a communication network; the network comprises a plurality of nodes; each of the nodes comprises at least one processing unit; each pair of the nodes is characterized by a first connection number; a first score is associated with each pair of (i) first first connection number; and (ii) second first connection number; each of the processing unit is programmed to execute the method; wherein the method comprising:

a. setting at least one first node to be a relay;

b. for one of the relays, selecting a second connection number for each third node; the third node is connected to the relay via a second node; the second connection number is selected from a group consisting of (i) first connection number of the pair of third node and the second node, (ii) first connection number of the pair of second node and the relay; and (iii) a combination thereof;

c. associating each of the third nodes with the first score; the first score is of pair consisting of (i) the first connection number characterizing the third node and the first node; and (ii) the second connection number characterizing the third node;

d. characterizing each of the second node with second score; the second score is selected from a group consisting of (i) first scores of the third nodes; (ii) sum of the first scores of the third nodes; and (iii) a combination thereof;

e. selecting at least one of the second nodes in accordance with the second score of the second nodes;

f. repeating steps (b) to (e) for all relays in the network;

g. setting at least one of the selected second nodes to be a relay in the network;
h. updating the network with the selected relays; and
i. if stopping criterion is not satisfied, repeating steps (b) to (h) for all relays in the network; the stopping criterion is selected from a group comprising of (i) numbers of relays in the network is larger than M, M is a predefined integer greater than 0; (ii) each of the nodes in the communication network is connected to at least one relay.

The present invention also provides a system for selecting at least one relay in a communication network; the network comprises a plurality of nodes; each of the nodes comprises at least one processing unit; each pair of the nodes is characterized by a first connection number; a first score is associated with each pair of (i) first first connection number; and (ii) second first connection number; for each the node the processing unit is programmed to set itself to be a relay; wherein each of the processing unit is programmed to execute the following steps:

a. select a second connection number for each third node; the third node is connected to the relay via a second node; the second connection number is selected from a group consisting of (i) first connection number of the pair of third node and the second node, (ii) first connection number of the pair of second node and the relay; and (iii) a combination thereof;
b. associate each of the third nodes with the first score; the first score is of pair consisting of (i) the first connection number characterizing the third node and the first node; and (ii) the second connection number characterizing the third node;
c. characterize each of the second node with second score; the second score is selected from a group consisting of (i) first scores of the third nodes; (ii) sum of the first scores of the third nodes; and (iii) a combination thereof;
d. select at least one of the second nodes in accordance with the second score of the second nodes;
e. repeat steps (a) to (d) for all relays in the network;
f. set at least one of the selected second nodes to be a relay in the network;
g. update the network with the selected relays; and
h. if stopping criterion is not satisfied, repeating steps (a) to (g) for all relays in the network; the stopping criterion is selected from a group comprising of (i) numbers of relays in the network is larger than M, M is a predefined integer greater than 0; (ii) each of the nodes in the communication network is connected to at least one relay.

Figure 1:
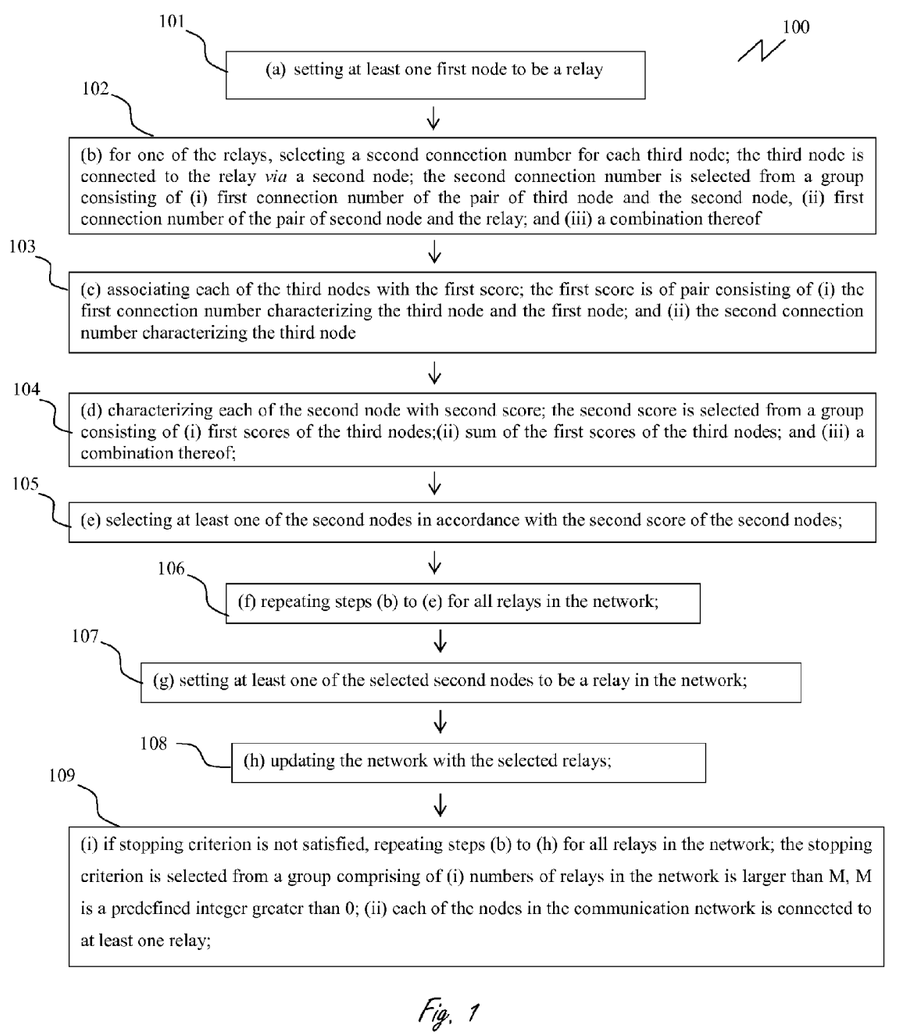
FIG. 1 shows a flow chart describing a method for selecting at least one relay in a communication network.

Reference is now made to FIG. 1 which illustrate in a non-limiting a method 100 for selecting at least one relay in a communication network; the network comprises a plurality of nodes; each of the nodes comprises at least one processing unit; each pair of the nodes is characterized by a first connection number; a first score is associated with each pair of (i) first first connection number; and (ii) second first connection number; each of the processing unit is programmed to execute the method;
wherein the method comprising:
a. setting 101 at least one first node to be a relay;
b. for one of the relays, selecting 102 a second connection number for each third node; the third node is connected to the relay via a second node; the second connection number is selected from a group consisting of (i) first connection number of the pair of third node and the second node, (ii) first connection number of the pair of second node and the relay; and (iii) a combination thereof;
c. associating 103 each of the third nodes with the first score; the first score is of pair consisting of (i) the first connection number characterizing the third node and the first node; and (ii) the second connection number characterizing the third node;
d. characterizing 104 each of the second node with second score; the second score is selected from a group consisting of (i) first scores of the third nodes; (ii) sum of the first scores of the third nodes; and (iii) a combination thereof;
e. selecting 105 at least one of the second nodes in accordance with the second score of the second nodes;
f. repeating 106 steps (b) to (e) for all relays in the network;
g. setting 107 at least one of the selected second nodes to be a relay in the network;
h. updating 108 the network with the selected relays; and
i. if stopping criterion is not satisfied, repeating 109 steps (b) to (h) for all relays in the network; the stopping criterion is selected from a group comprising of (i) numbers of relays in the network is larger than M, M is a predefined integer greater than 0; (ii) each of the nodes in the communication network is connected to at least one relay.

In some embodiments of the current invention, the method as described above, additionally comprising step of performing said method on a time changing network; said method is performed at predetermined time steps. For example, time steps can be periodic or random. The method may also be performed only upon request and not at predetermined times.

At each time the method is performed said first connection number, second connection number and first score may be redefined partially or fully.

In some embodiments of the current invention, step of characterizing 104 second node with second score depends upon number of relays connected to said second node.

In some embodiments of the current invention, first connection number characterizes quality of connection.

In some embodiments of the current invention, the method as described above, additionally comprising step of providing step of changing the predetermined integer M.

Figure 2:
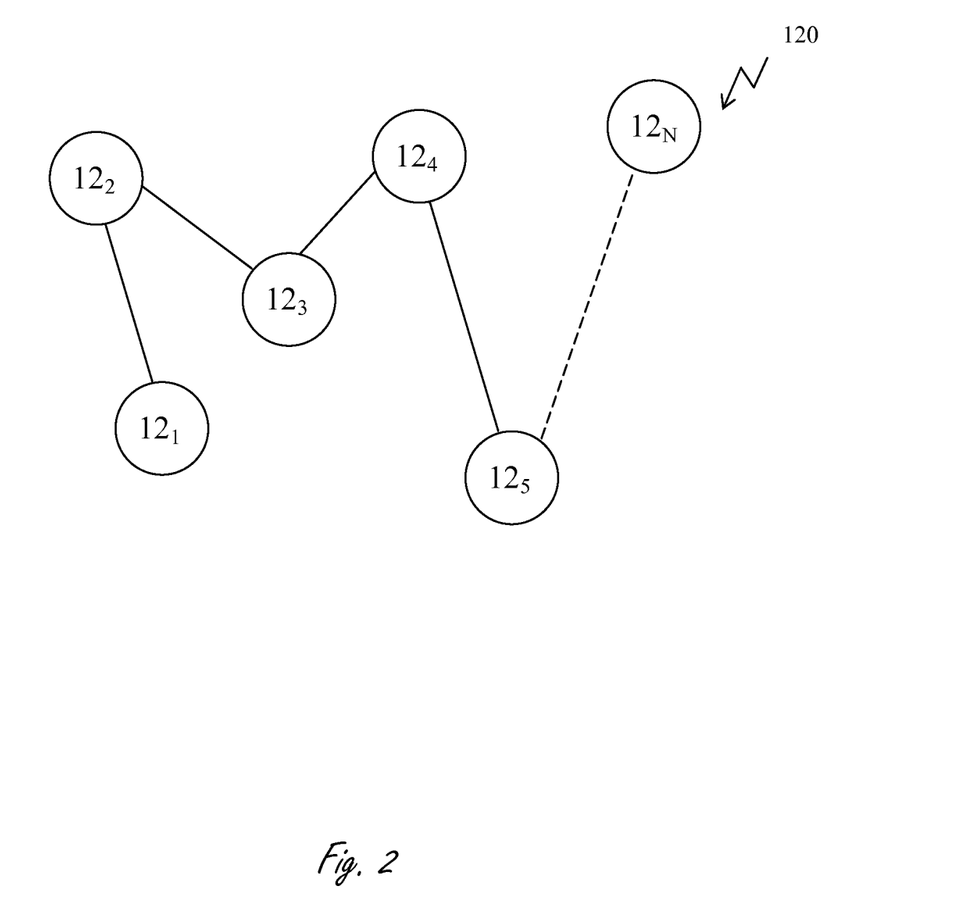
FIG. 2 illustrates a network comprising a plurality of nodes.

Reference is now made to FIG. 2 which describes a communication network 120 comprising a plurality of nodes $12_1$, $12_2$, $12_3$ ... $12_N$. Each of the nodes $12_1$, $12_2$, $12_3$ ... $12_N$ comprises at least one processing unit. The plurality of nodes is a system for selecting at least one relay in the communication network. Each pair of said nodes is characterized by a first connection number; a first score is associated with each pair of (i) first first connection number; and (ii) second first connection number; for each said node said processing unit is programmed to set itself to be a relay; wherein each of said processing unit is programmed to execute the following steps:

a. select a second connection number for each third node; said third node is connected to said relay via a second node; said second connection number is selected from a group consisting of (i) first connection number of said pair of third node and said second node, (ii) first connection number of said pair of second node and said relay; and (iii) a combination thereof;
b. associate each of said third nodes with said first score; said first score is of pair consisting of (i) said first connection number characterizing said third node and said first node; and (ii) said second connection number characterizing said third node;

c. characterize each of said second node with second score; said second score is selected from a group consisting of (i) first scores of said third nodes; (ii) sum of said first scores of said third nodes; and (iii) a combination thereof;

d. select at least one of said second nodes in accordance with said second score of said second nodes;

e. repeat steps (a) to (d) for all relays in said network;

f. set at least one of said selected second nodes to be a relay in said network;

g. update said network with said selected relays; and h. if stopping criterion is not satisfied, repeating steps (a) to (g) for all relays in said network; said stopping criterion is selected from a group comprising of (i) numbers of relays in said network is larger than M, M is a predefined integer greater than 0; (ii) each of said nodes in said communication network is connected to at least one relay.

In some embodiments of the current invention, the system as described above, wherein said processing unit is programmed to execute actions (a)-(h) on a time changing network. For example, time steps can be periodic or random. Actions (a)-(h) may also be performed only upon request and not at predetermined times.

In some embodiments of the current invention, the system as described above, wherein each of said first connection number, second connection number and first score is defined for each time said actions (a)-(h) are performed.

In some embodiments of the current invention, the system as described above, wherein said characterizing second node with second score depends upon number of relays connected to said second node.

In some embodiments of the current invention, the system as described above, wherein said predetermined integer M is changeable.

In some embodiments of the current invention, first connection numbers are given at the stage that the network is being constructed and the algorithm is performed using these predetermined numbers. In the case that there are N connection numbers, a matrix 400 as illustrated in FIG. 4 representing the score of changing connection number will be in the size of N×N. Each link can be characterized by N binary numbers, which can transfer $2^N-1$ bits of information In some embodiments of the current invention, the system as described above, the first connection number characterizes quality of connection. For example, zero can describe no connection at all and any other number in some predetermined scale will represent whether the connection is weak or strong. The first score is aimed to determine the gain the system gets from strengthening or weakening the connection, that is, from changing the connection strength from one number to another. Once a score is set for each such connection, each node in the system runs the algorithm on itself, that is, it starts by setting itself into a relay.

Figure 3:
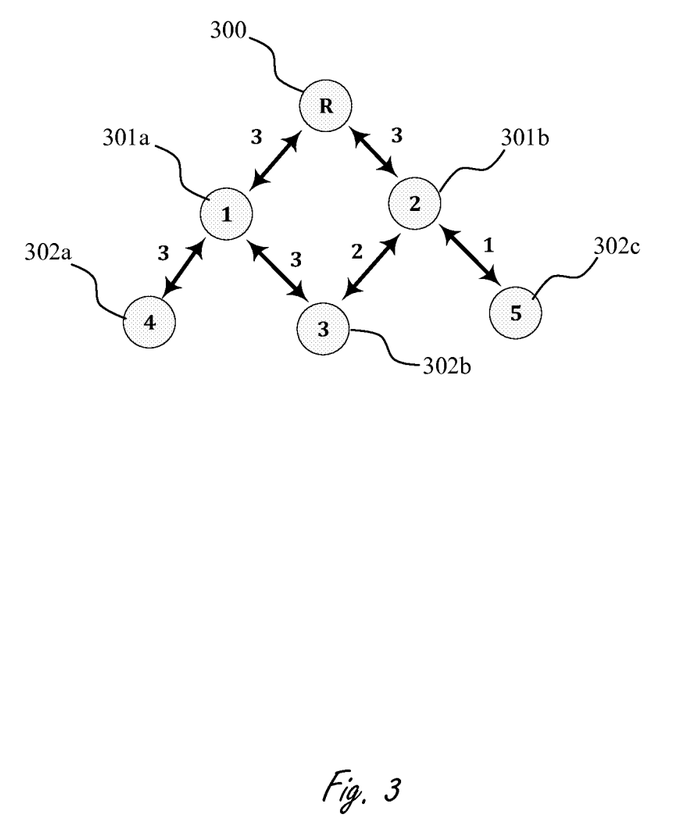
FIG. 3 describes a relay and related nodes connected to the relay, where strength of connection is indicated.

Once the node is set to be relay 300 as illustrated in FIG. 3, it starts to grade each node (which we call now, first connected node 301a, 301b, indicating it is the node connected directly to the relay 300) connected to the relay 300 in order to select the next relay. Grading is done by evaluating the connection number each first connected node will provide by connecting the second connected nodes 302a, 302b, 302c (i.e. the node connected to the first connected node 301a(b) and that will now be connected to the relay 300 via the first connected node 301a(b)).

Once the connection number is evaluated, a first grade can be given to each new connection between the relay 300 and the second connected node 302a (b or c).

The first grade will be the grade given for changing the connection number from (i) connection number between the relay 300 and the second connected node 302a (b or c) from what it is before connecting it via the first connected node 301a (or b) to (ii) the connection number between the relay 300 and the second connected node 302a (b or c) from what it is before connecting it via the first connected node 301a (or b).

Figure 4A:
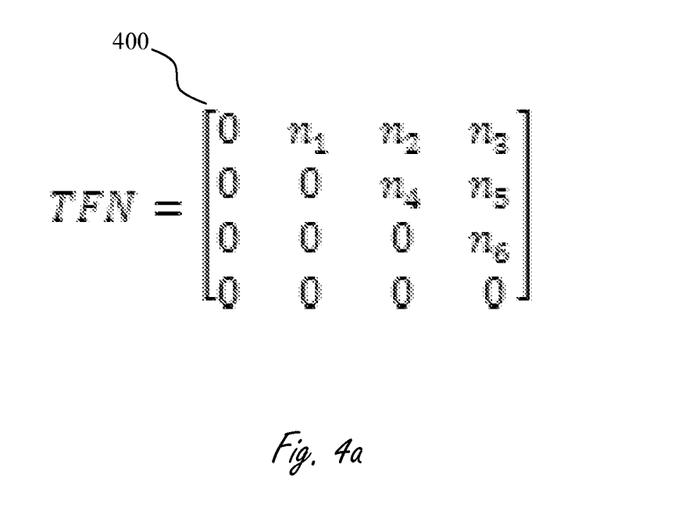
FIGS. 4a and 4b shows transfer functions for grading change of connection strength between two nodes.

Reference is now made to FIG. 4a which shows in a non-limiting manner an example for a matrix grading the changes of first connection numbers (i.e. change from 0 to 3 in $n_3$ and change from $n_3$ to 0 is 0). These first grades are summed for each node (or any other function that takes them into account), and the node with the highest grade will become the next relay.

This procedure continues for each node until a stopping criterion is fulfilled. The result is a method for finding an optimal spanning tree of the network.

Example 1

This example is provided in a non-limiting manner to illustrate one scope of the invention, wherein in a method for selecting at least one relay in a communication network, the network comprises a plurality of nodes; each of the nodes comprises at least one processing unit; each pair of the nodes is characterized by an integer between 0-3, where 0 indicates that the two nodes are not connected, and any number between 1-3 indicates a connection between the nodes and the strength of this connection. An illustration can be seen in FIG. 3 where relay 300 is connected to two nodes second node1 301a and second node2 301b with first connection numbers 3 and 3. node1 301a is connected to third node 4 302a and third node 3 302b with first connection number 3 and 3. node2 301b is connected to third node5 302c and third node 3 302b with first connection number 1 and 2 respectively. Relay is not connected the third nodes (i.e. third node 3 302b, third node 4 302a, and third node5 302c), hence, the first connection number between relay 300 and any third node is 0.

Figure 4B:
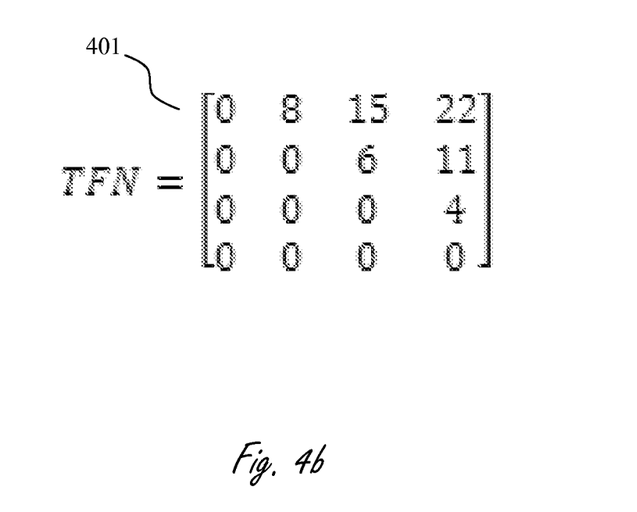

A first score is given to any two integers between 0-3 shown in a matrix 401 in FIG. 4b, e.g. {0,3} is given a score of 22, {3,0} is given score 0, and {1,2} is given a score 6). This score is used to evaluate the "desirability" of changing the connection strength between two states; relating to the previous example, changing a connection from 0 to 3 is very "desirable" (hence, receiving a grade 22), while changing the grade from 3 to 0 is very "undesirable" (hence, receiving the grade 0).

A second connection number is now given for each third node 302 when connected via a second node 301. The second connection number of:

(i) third node 4 302a is 3 when connected via node 301a and 0 when connected via node 301b;

(ii) third node 3 302b is 3 when connected via node 301a and 2 when connected via node 301b;

(iii) third node 5 302c is 0 when connected via node 301a and 1 when connected via node 301b;

A first score is given now to each third node 302 when connected to each second node 301. The first score is based on changing the connection number between relay 300 and third node 302 from first connection number (zero in this case) to the second connection number:

(i) first score of third node 4 302*a* is 22 when connected via second node 301*a* and 0 when connected via second node 301*b* according to matrix 401.

(ii) first score of third node 3 302*b* is 22 when connected via second node 301*a* and 15 when connected via second node 301*b* according to matrix 401.

(iii) first score of third node 5 302*c* is 0 when connected via second node 301*a* and 8 when connected via second node 301*b* according to matrix 401.

A second score is now given to the second nodes 301*a* and 301*b* according to the first score of the third nodes 302:

(i) second score of second node 301*a* is the sum of the first scored of the third nodes 302 when connects via second node 301*a*: 22+22+0=44;

(ii) second score of second node 301*b* is the sum of the first scored of the third nodes 302 when connects via second node 301*a*: 0+15+8=23.

The score of the second node 301*a* is higher, therefore it is selected to be a relay.

It will be appreciated by persons skilled in the art that embodiment of the invention are not limited by what has been particularly shown and described hereinabove. Rather the scope of at least one embodiment of the invention is defined by the claims below.

The invention claimed is:

1. A method for scoring in an ad hoc communication network; said network comprises a plurality of nodes; each of said nodes comprises at least one processing unit; each pair of said nodes is characterized by a first connection number, wherein the connection number assumes one of N values; further wherein the connection number characterizes a quality of connection between the pair of nodes; further wherein a desirability score $(S_D)_{ij}$ in an N×N matrix $S_D$ characterizes a desirability of changing the connection number of two nodes from an ith value of said connection number to a jth value of said connection number, wherein i and j are both integers from 1 to N; each of said processing units is programmed to execute said method;

said method comprising steps of:
a. selecting at least one first node;
b. for one of said first nodes, selecting a second connection number for each pair of a third node and a second node, wherein said third node is connected to said first node via said second node; further wherein said second connection number is associated with the corresponding first connection number of said pair of the third node and the second node;
c. associating a first desirability score with each of said third nodes when connected to each of said second nodes, wherein said first desirability score $(S_D)_{pq}$ is selected from said matrix $S_D$ of desirability scores, wherein (i) said first connection number characterizing said third node and said first node is a pth value of said connection number; and (ii) said second connection number characterizing said third node and said second node is a qth value of said connection number; and
d. characterizing each of said second nodes with a second score, wherein said second score is a sum of first scores associated with said third nodes connected to said second node.

2. The scoring method according to claim 1 applied to a heuristic method for selecting at least one relay in a communication network, wherein said selected at least one first node are set as relays, additionally comprising steps of:
e. selecting at least one of said second nodes in accordance with said second scores of said second nodes;
f. repeating steps (b) to (e) for all relays in said network;
g. setting at least one of said selected candidate relays to be a relay in said network;
h. updating said network with said selected relays; and
i. if a stopping criterion is not satisfied, repeating steps (b) to (h) for all relays in said network; said stopping criterion is selected from a group comprising of
(i) number of relays in said network is larger than M, where M is a predefined counting number; and
(ii) each of said nodes in said communication network is connected to at least one relay;
wherein said heuristic method results in a sub-optimal selection of relays; and
wherein said heuristic method is of polynomial run time.

3. A system for scoring in an ad hoc communication network; said network comprises a plurality of nodes; each of said nodes comprises at least one processing unit; pairs of said nodes are characterized by a first connection number, wherein the connection number assumes one of N values; further wherein the connection number characterizes a quality of connection between the pair of nodes; further wherein a desirability score $(S_D)_{ij}$ in an N×N matrix characterizes a desirability of changing the connection quality of a connection between two nodes from an ith value of said connection number to a jth value of said connection number; for each said node said processing unit is programmed to set itself to be a first node; wherein each of said processing units is programmed to execute the following tasks:
a. selection of a second connection number for each pair of a third node and a second node, wherein said third node is connected to said first node via a second node; further wherein said second connection number is associated with the corresponding first connection number of said pair of the third node and the second node;
b. association of a first desirability score with each of said third nodes when connected to each of said second nodes, wherein said first desirability score $(S_D)_{pq}$ is selected from said matrix $S_D$ wherein (i) said first connection number characterizing said third node and said first node is a pth value of said connection number; and (ii) said second connection number characterizing said third node and said second node is a qth value of said connection number;
c. characterization of each of said second nodes with a second score; said second score is a sum of first scores associated with said third nodes connected to said second node; and
d. selection of at least one of said second nodes in accordance with said second score of said second nodes.

4. The method according to claim 1, additionally comprising step of changing said predetermined counting number M.

5. The system according to claim 3, wherein said processing unit of each first node is programmed to be a relay; further wherein each of said processing units is programmed to execute the following additional tasks:
e. set at least one of said selected second nodes to be a relay in said network;
f. update said network with said selected relays; and
g. if a stopping criterion is not satisfied, repeat (a) to (f) for all relays in said network; said stopping criterion is selected from a group comprising of (i) number of relays in said network is larger than M, where M is a predefined counting number; (ii) each of said nodes in said communication network is connected to at least one relay;

wherein said selected relays comprise a sub-optimal selection of relays.

6. The system according to claim 5, wherein said predetermined counting number M is changeable.

7. The method according to claim 2, additionally comprising steps of performing said method on a time changing network; said method is performed at predetermined time steps.

8. The method according to claim 2, wherein each of said first connection number, second connection number and first score is defined for each time said method is performed.

9. The method according to claim 2, additionally comprising step of performing the method on a time changing network upon demand.

10. The method according to claim 9, wherein said each of first connection number, second connection number and first score is defined for each time said method is performed.

11. The method according to claim 2, wherein said characterizing second node with second score depends upon number of first nodes connected to said second node.

12. The system according to claim 5, wherein said processing unit is programmed to execute tasks (a)-(d) on a time changing network; said actions are performed at predetermined time steps.

13. The system according to claim 12, wherein each of said first connection number, second connection number and first score is defined for each time said tasks (a)-(d) are performed.

14. The system according to claim 5, wherein said processing unit is programmed to execute tasks (a)-(d) on a time changing network upon demand.

15. The system according to claim 14, wherein said each of first connection number, second connection number and first score is defined for each time said method is performed.

16. The system according to claim 5, wherein said characterizing second node with second score depends upon number of first nodes connected to said second node.

* * * * *